UNITED STATES PATENT OFFICE.

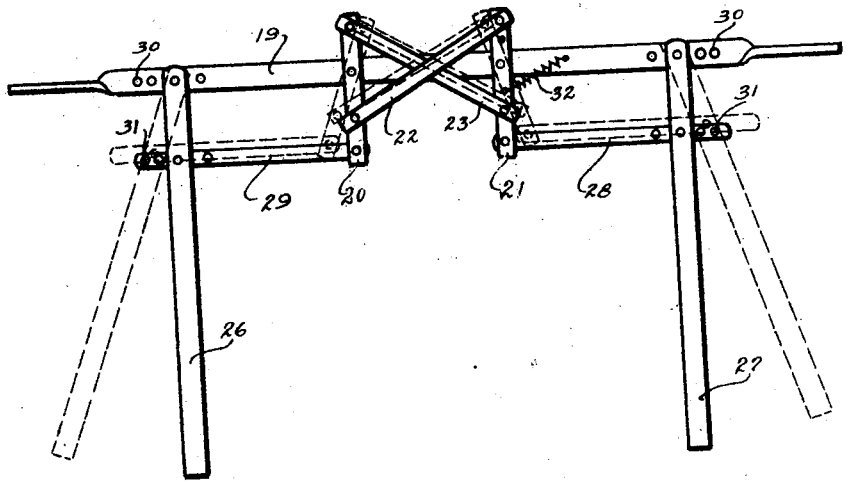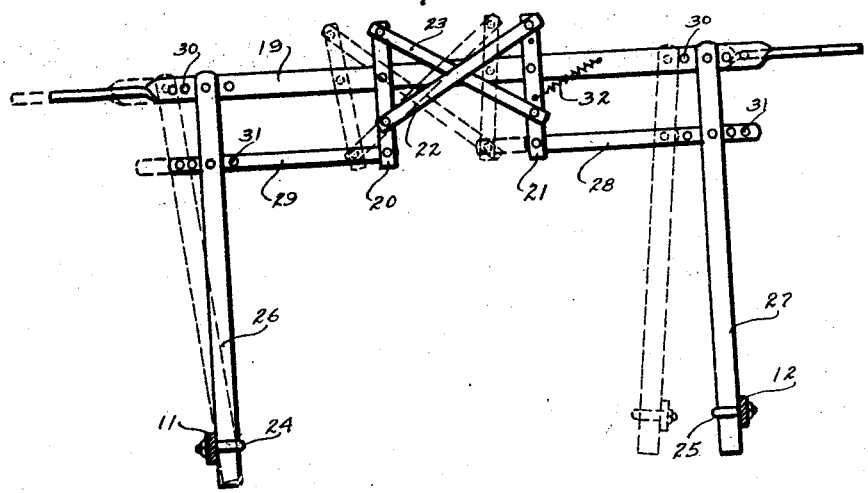

LEVI W. BEER, OF MANSFIELD, OHIO, ASSIGNOR, BY DIRECT AND MESNE ASSIGNMENTS, TO RODERICK LEAN MANUFACTURING COMPANY, OF MANSFIELD, OHIO, A CORPORATION OF NEW JERSEY.

PIVOT-AXLE CULTIVATOR.

1,411,152. Specification of Letters Patent. Patented Mar. 28, 1922.

Application filed March 6, 1917, Serial No. 152,501. Renewed August 18, 1921. Serial No. 493,429.

*To all whom it may concern:*

Be it known that I, LEVI W. BEER, a citizen of the United States of America, residing at Mansfield, in the county of Richland and State of Ohio, have invented certain new and useful Improvements in Pivot-Axle Cultivators, of which the following is a specification.

This invention relates to pivot axle cultivators.

The primary object of the present invention is to provide a yielding yoke mechanism which is adapted to connect the cultivator beams to a spreader beam which is in turn connected to the pivot axles of a cultivator upon which the ground or cultivator wheels are mounted.

Further objects consist in providing and constructing a yielding yoke mechanism that connects the yoke mechanism to the cultivator beams and to the pivot axles through the medium of a spreader beam or bar in such a manner as to permit the cultivator beams to be raised vertically simultaneously and independent of each other, without affecting the pivot axles; to permit said beams to be moved to and from each other simultaneously in a transverse direction without affecting the pivot axles; to permit lateral movement in unison of the cultivator beams and simultaneously therewith actuate the pivot axles to change the direction of travel of the cultivator wheels, to permit one of the beams to be moved laterally while the other beam is permitted to remain stationary, thereby imparting simultaneous movement to the pivot axles, the movement imparted to the pivot axles and the ground or cultivator wheels being one-half the movement imparted when both beams are moved in a transverse or lateral direction simultaneously.

A further object is to provide a yielding yoke mechanism comprising links and vertically pivoted bars that are operable when lateral movement is imparted to the cultivator beams to and fro simultaneously, to actuate the links in such a manner as to exert a push and pull movement upon the vertical bars which are pivoted to the spreader beam. In other words, providing a yielding yoke mechanism that will facilitate and expedite simultaneous lateral movement of the cultivator beams to and from each other and independent of each other in a lateral and vertical direction for the purpose intended.

Another object is to provide means of connecting the yoke mechanism to the cultivator beams so as to permit vertical movement thereof freely and without friction at any point of the spread of the vertical connecting bars to correspond with the spread or adjustment of the pivoted ends of the cultivator beams.

A further object is to construct a yielding yoke mechanism of a minimum number of parts, eliminating ratchets, levers, and springs and combining and constructing the mechanism in such a manner as to obviate the necessity of bending, offsetting and making special shapes or forms to provide a yielding yoke mechanism that will accomplish the objects herein described.

These and other objects are attained by the mechanism illustrated in the accompanying drawings, in which:

Fig. 6 is a front detail view in elevation showing the yielding yoke mechanism and spreader beam in normal position in full lines and showing the movement or throw of the yoke mechanism in a lateral direction in dotted lines when lateral unison movement in opposite directions is imparted to the cultivator beams.

Fig. 7 shows the position assumed by the yoke mechanism and spreader beam in dotted lines when said mechanism is actuated laterally by one cultivator beam independent of the other.

Figure 1:
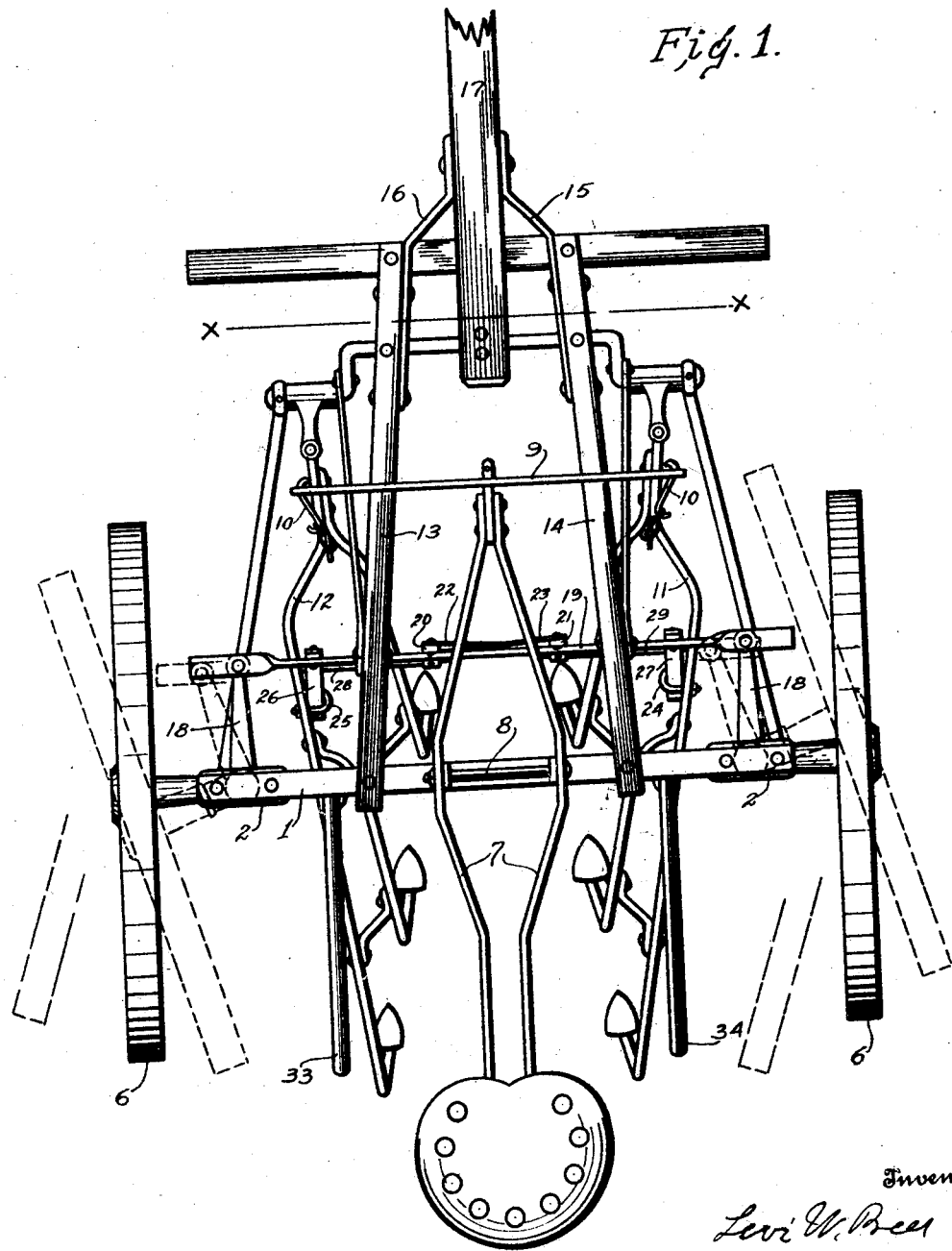
Figure 1 is a plan view showing a conventional type of pivot axle cultivator provided with a seat lever mechanism for counterbalancing the cultivator beams; said view also shows the application of the present invention thereto.
Figure 2:
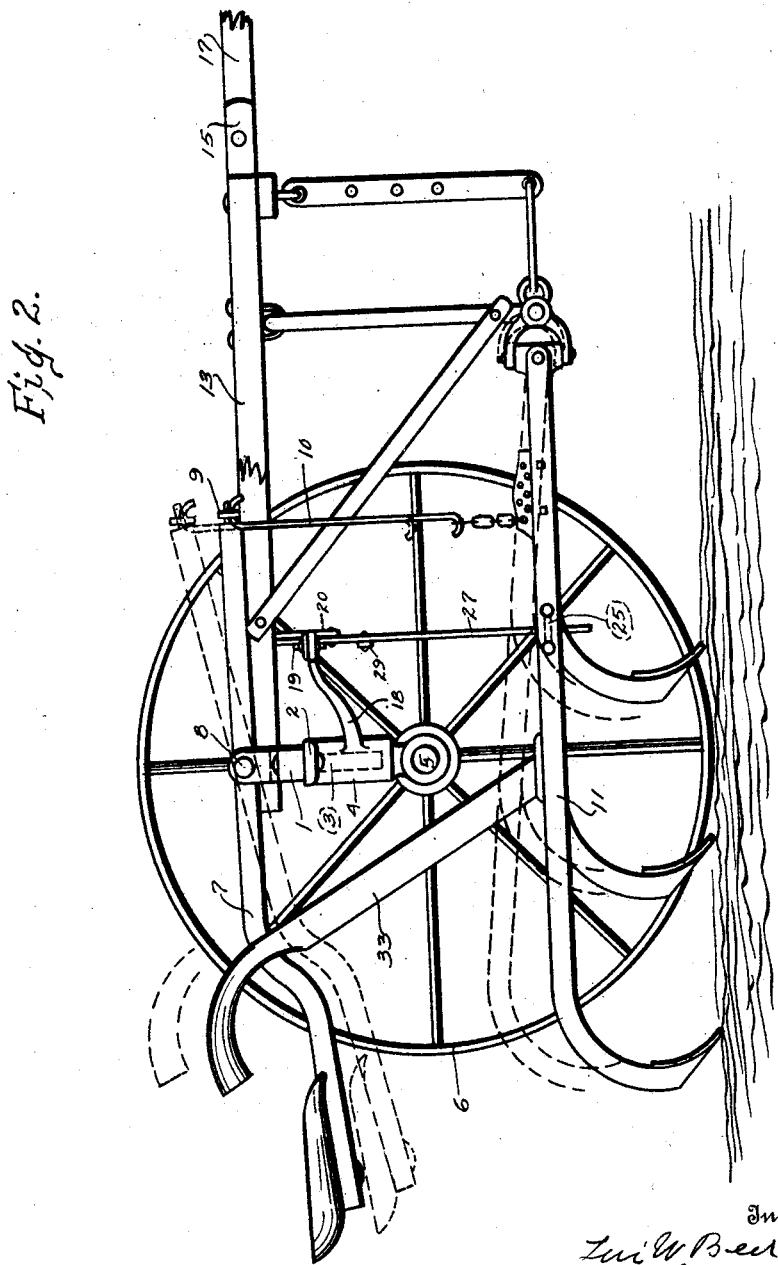
Figure 2 shows a side view of Fig. 1 with one of the traction wheels removed to exhibit the mechanism clearly.
Figure 3:
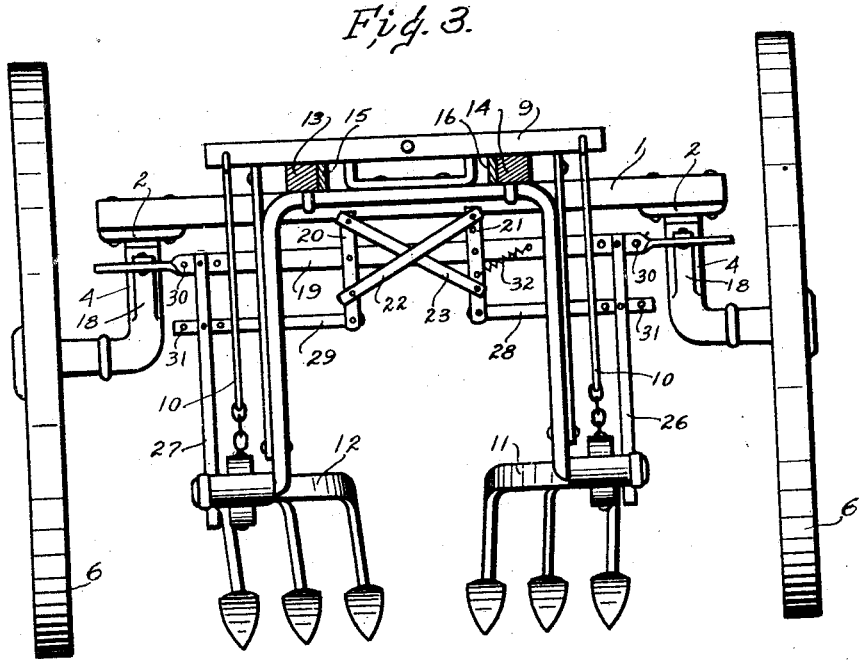
Figure 3 is a front view of Fig. 1, taken on the line X X.
Figure 5:
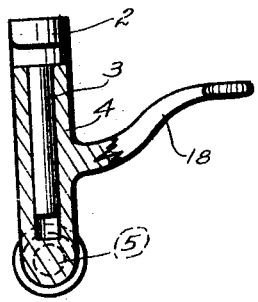
Figure 5 is a side elevation showing the construction in detail of a pivot axle and socket standard partly in section taken on the line O O of Fig. 4.
Figure 4:
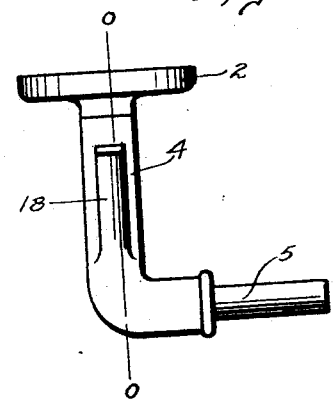
Figure 4 is a side elevation showing in detail the construction of a conventional type of pivot axle and a socket standard.

In the drawings, reference numeral 1 represents an axle beam, 2 brackets which are provided with shafts 3 and attached to the axle beam by any well known fastening means.

Socket standards 4 are provided to receive and journal the shafts 3. Stub axles 5 are fitted to the socket standards to provide journals for the cultivator wheels 6.

The above described parts and the arrangement thereof provide an arched shape structure and means to pivot the stub axles upon which the cultivator wheels are mounted.

A lever seat beam 7 pivots over the axle beam 1 upon the bolt 8. A cross bar 9 is pivoted to the forward end of the seat beam and chains or link bars 10 are attached to the end of the cross bar and to the pivoted cultivator beams 11 and 12. The chains or links can be adjusted to connect with the beams at different points on the beams so as to provide means of increasing or decreasing the leverage or lifting power of the seat lever beam to permit the weight of different drivers to counterbalance the cultivator beams.

The frame-work of the cultivator comprises frame bars 13 and 14 and braces 15 and 16 having a pole 17 attached thereto.

The above describes in part a conventional type of pivot axle cultivator and the application thereto of a conventional type of seat lever lifting mechanism for counterbalancing the weight of the cultivator beams and drivers of different weights.

The mechanism above described, however, forms no part of the present invention. The operation and construction of the present invention will now be described.

Arms 18 are provided on the socket standards 4 and a spreader beam 19 is pivotally attached to the arms connecting the socket standards for movement in unison. Bars 20 and 21 are pivoted vertically to the spreader beams and in such a manner as to leave one end of each bar projecting above and the other end below the spreader beam. Link bars 22 and 23 are provided having one end pivotally connected to one of the vertical bars below the pivotal connections of said vertical bars to the spreader beam and the other or opposite ends pivotally connected to the other vertical bars above the pivotal connections of the vertical bars to the spreader beam.

The yielding yoke mechanism can be constructed as described, if desired, and when so constructed, the ends of the vertical bars 26 and 27 extend into and loosely engage the eye bolts 24 and 25 which are secured to the cultivator beams or gangs. To provide means of operating the cultivator beams vertically without undue friction at any predetermined point of the spread or transverse adjustment of the beams, auxiliary bars 26 and 27 for operating the yoke mechanism are vertically pivoted to the spreader beam in parallel relation with respect to each other, said bars 26 and 27 being spaced from the first mentioned vertical bars 20 and 21 of the yielding yoke a sufficient distance to correspond to the spread of the cultivator beams and engage the eye bolts thereof substantially in a vertical line.

The auxiliary bars are connected to the vertical bars of the yielding yoke mechanism by link bars 28 and 29. Apertures 30 and 31 are provided in the spreader beam and link bar 28 and 29 for adjusting purposes. A spring 32 is provided and adapted to be connected to one of the vertical bars above or below its pivotal connection and to the spreader beam for an in or out throw of the soil as desired.

It will thus be apparent that if the operator of the cultivator changes the spread of the cultivator beams to conform to corn rows or the like of a particular width, he can also adjust the pivotal connections of the auxiliary bars on the spreader beam to coincide with the spread of the cultivator beams thereby permitting the auxiliary bars to engage the eye bolts substantially in a vertical line, and also thereby eliminating undue friction between the auxiliary bars and the eye bolts of the cultivator beams which might otherwise be caused by excessive angular relation of the auxiliary bars with respect to their engagement with the eye bolts of the cultivator beams.

In cultivating straight or substantially straight corn rows or the like, the driver manipulates the handles 33 and 34 simultaneously moving them in opposite lateral directions which movement does not effect the direction of the travel of the cultivator wheels as the yoke mechanism yields without imparting movement to the spreading beam.

If the row to be cultivated is crooked, the driver moves the cultivator beams laterally in either direction in unison following the contour of the row, during such movement of the beams the yoke mechanism does not yield, therefore, when said lateral movement is imparted to the cultivator beams, a simultaneous like movement is also transmitted directly to the spreader beam which in turn forces the cultivator wheels to change their direction of travel in unison and to correspond with the lateral movement imparted to the cultivator beams.

When the row to be cultivated is irregular or uneven in contour and lateral movement is imparted to one of the cultivator beams independent of the other to conform to the irregularity of the row while the other is permitted to remain idle, the spreader beam is moved in unison therewith thereby simultaneously actuating the cultivator wheels to change their direction of travel to the extent of one-half the movement transmitted to said cultivator wheels in the event of moving both cultivator beams simultaneously in the same lateral direction and in unison.

I claim—

1. In a cultivator, cultivator beams, pivot axles, a spreader beam pivotally connected to the pivot axles, cultivator wheels mounted on the pivot axles, a yielding yoke mechanism pivotally connected to the spreader beam comprising pivoted vertical bars and pivoted link bars having their ends connected to the vertical bars above and the opposite ends connected below the pivots of the vertical bars, said yielding yoke being also provided with depending bars loosely connected to the cultivator beams whereby simultaneous lateral movement of the cultivator beams in one direction will impart simultaneous movement to the pivot axles changing the direction of travel of the cultivator wheels.

2. In a pivot axle cultivator comprising pivoted cultivator beams, pivot axles, means of connecting the pivot axles of the cultivator for simultaneous movement, a yielding yoke mechanism comprising pivoted vertical bars and pivoted link bars having their opposite ends connected to the vertical bars above and below the pivots of the vertical bars; said mechanism being movably connected to the means connecting the pivot axles and to the cultivator beams whereby simultaneous lateral movement of said beams in a lateral direction will impart movement in unison therewith to the pivot axles.

3. In a cultivator, pivot axles, cultivator beams, a spreader beam pivotally connected to the pivot axles, vertically arranged bars pivoted to the spreader beam, cross link bars having their ends pivoted to the vertically arranged bars above and below the pivots of the vertical bars, and means for movably connecting said vertically arranged bars to said cultivator beams.

4. In a cultivator, including pivot axles, cultivator beams, a spreader beam pivotally connected to the pivot axles, vertically arranged bars pivoted to the spreader beam, link bars having their ends pivoted to the vertically arranged bars, auxiliary depending bars flexibly connected to said cultivator beams and pivoted to said spreader beams, and horizontally arranged link bars connecting the vertically arranged pivotal bars to the auxiliary bars.

5. In a pivot axle cultivator, cultivator beams attached to the cultivator and arranged to swing toward and from each other, earth working elements carried by said beams, a spreader beam pivotally connected to the pivot axles, a yielding yoke mechanism pivotally mounted upon the spreader beam, auxiliary bars pivotally hung from the spreader beam and connected to the cultivator beams and adapted to be spaced from the yoke mechanism at varying distances for maintaining said bars substantially in a vertical position at any point of the adjustment or spread of the cultivator beams, and link bars connected to said auxiliary bars and to the yoke mechanism for operating same.

6. In a cultivator, pivot axles, cultivator beams pivotally attached to the cultivator and arranged to be adjusted to and from each other, earth working tools attached to the beams, a spreader beam connected to the pivot axles, a yielding yoke mechanism pivotally mounted upon the spreader beam and connected to the cultivator beams and to the spreader beam, auxiliary bars pivotally hung from the spreader beam and movably connected to said cultivator beam, means for spacing said auxiliary bars from said yoke mechanism at varying distances therefrom to normally carry said bars substantially in a vertical position at any point of the adjustment or spread of the cultivator beams, link bars connected to said bars and yoke mechanism for operating same.

7. In a pivot axle cultivator, pivot axles, pivoted cultivator beams, means connecting the pivot axles for movement in unison, a yielding yoke mechanism comprising two parallel bars pivoted on the axle connecting means, cross links having their ends pivotally connected to the opposite pivoted portions of the parallel bars, auxiliary parallel bars spaced from the yoke mechanism and pivoted to the connecting means of the pivoted axles, and connected to the cultivator beams, and links connecting said auxiliary parallel bars to the pivoted parallel bars of the yoke mechanism.

In testimony whereof I affix my signature.

LEVI W. BEER.